(12) United States Patent
Daehler et al.

(10) Patent No.: US 8,369,059 B2
(45) Date of Patent: Feb. 5, 2013

(54) METHOD FOR DISTURBANCE CURRENT COMPENSATION FOR AN ELECTRICAL SYSTEM, AND DISTURBANCE CURRENT COMPENSATION DEVICE

(75) Inventors: Peter Daehler, Remigen (CH); Stefan Wicki, Niederlenz (CH)

(73) Assignee: ABB Schweiz AG, Baden (CH)

( * ) Notice: Subject to any disclaimer, the term of this patent is extended or adjusted under 35 U.S.C. 154(b) by 165 days.

(21) Appl. No.: 12/628,536

(22) Filed: Dec. 1, 2009

(65) Prior Publication Data

US 2010/0134943 A1  Jun. 3, 2010

(30) Foreign Application Priority Data

Dec. 2, 2008  (EP) .................................... 08170481

(51) Int. Cl.
*H02H 1/06*  (2006.01)
(52) U.S. Cl. ...................................................... 361/113
(58) Field of Classification Search .................... 361/113
See application file for complete search history.

(56) References Cited

U.S. PATENT DOCUMENTS

| | | | |
|---|---|---|---|
| 5,291,299 A * | 3/1994 | Karna ........................... 315/323 |
| 6,437,997 B1 * | 8/2002 | Inarida et al. .................... 363/37 |
| 7,002,333 B2 * | 2/2006 | Blasco Claret et al. ........ 323/356 |
| 2005/0083627 A1 | 4/2005 | Wang et al. |
| 2007/0109708 A1 * | 5/2007 | Hussman et al. .............. 361/113 |
| 2009/0212640 A1 * | 8/2009 | Terorde .......................... 307/105 |

* cited by examiner

*Primary Examiner* — Rexford Barnie
*Assistant Examiner* — Ann Hoang
(74) *Attorney, Agent, or Firm* — Buchanan Ingersoll & Rooney, P.C.

(57) ABSTRACT

An exemplary method is disclosed for disturbance current compensation for an electrical system by a disturbance current compensation device, which electrical system has a voltage source and a series circuit which is connected via a conductor in parallel with the voltage source. The series circuit has an inductance and a capacitance, with the inductance being connected in series with the capacitance via a conductor. To compensate for disturbance currents, the conductor for the connection of the voltage source to the series circuit of the inductance with the capacitance, and/or the conductor of the series circuit between the inductance and the capacitance, can be surrounded by a ring (e.g., a portion of the conductor can be substantially surrounded by the ring) which can be magnetized. The ring includes an air gap of the disturbance current compensation device. A compensation voltage can be applied by magnetization of the ring. The ring can be magnetized by a magnetization coil of the disturbance current compensation device.

8 Claims, 2 Drawing Sheets

METHOD FOR DISTURBANCE CURRENT COMPENSATION FOR AN ELECTRICAL SYSTEM, AND DISTURBANCE CURRENT COMPENSATION DEVICE

RELATED APPLICATION

This application claims priority under 35 U.S.C. §119 to European Patent Application No. 08170481.9 filed in Europe on Dec. 2, 2008, the entire content of which is hereby incorporated by reference in its entirety.

FIELD

The disclosure relates to the field of power electronics based, for example, on a method for disturbance current compensation for an electrical system.

BACKGROUND INFORMATION

In many electrical systems with a voltage source which, for example, is a voltage source for an electrical power supply system, a series circuit is also provided which is connected to the voltage source via a conductor and has an inductance and a capacitance, with the inductance then being connected in series with the capacitance via a conductor. An active or passive electrical load or a current source, such as a rotating electrical machine with an associated power-electronic feed device, can be connected in parallel with the capacitance, in which case the rotating electrical machine can normally be operated as a motor or generator.

If the voltage source is a voltage source of an electrical AC or DC voltage power supply system, there can be stringent requirements relating to the feeding in of undesirable alternating currents. Undesirable alternating currents can originate, for example, from the load side of the electrical system, that is to say by way of example from a rotating electrical machine and its power-electronic feed device. The dimensioning of the inductance and the capacitance can be used to restrict undesirable alternating currents. However, the undesirable alternating currents can be reduced only to limited restricted extent by the dimensioning of the inductance and the capacitance, and this is associated with increased weight, spatial requirements and additional costs.

An apparatus such as this is disclosed in US 2005/0083627 A1. In this document, the disclosed apparatus has a filter circuit which is connected via a conductor to a voltage source for an electrical system. The filter circuit is formed by two parallel-connected series circuits, each having an inductance with a capacitance. A transformer winding of a coupling transformer is connected in series with the filter circuit.

SUMMARY

A method for current compensation for an electrical system is disclosed having a voltage source and a series circuit of an inductance and a capacitance connected in parallel with the voltage source wherein a conductor connected to or within the series circuit is surrounded by a ring which can be magnetized and which includes an air gap of a disturbance current compensation device, the method comprising: magnetizing the ring via a magnetization coil of the disturbance current compensation device; and applying a compensation voltage by magnetization of the ring to the conductor connected to or within the series circuit of the inductance and the capacitance.

A disturbance current compensation device is disclosed for an electrical system, which electrical system has a voltage source and a series circuit which is connected via a conductor in parallel with the voltage source and has an inductance and a capacitance connected in parallel with the voltage source, the device comprising: a ring configured for surrounding a conductor connected to or within the series circuit of the inductance with the capacitance, which ring can be magnetized; and an air gap for application of a compensation voltage by magnetization of the ring via a magnetization coil.

BRIEF DESCRIPTION OF THE DRAWINGS

The reference symbols used in the drawings and their meanings are listed in the list of reference symbols. In principle, identical parts are provided with the same reference symbols in the figures. The disclosed embodiments represent examples of the subject matter of the disclosure, and have no restrictive effect.

In the figures.

DETAILED DESCRIPTION

An exemplary method and apparatus are disclosed for an electrical system, by which undesirable alternating currents can very largely be suppressed.

An exemplary electrical system has a voltage source and a series circuit which is connected via a conductor in parallel with the voltage source and has an inductance and a capacitance, with the inductance being connected in series with the capacitance via a conductor. In an exemplary method according to the disclosure, the conductor can include a conductor for connection of the voltage source to the series circuit of the inductance with the capacitance, and the conductor within the series circuit of the inductance with the capacitance. The conductor is surrounded by a ring, which can be magnetized, having an air gap of a disturbance current compensation device. A compensation voltage can be applied by magnetization of the ring, which can be magnetized by means of a magnetization coil of the disturbance current compensation device, to the conductor for the connection of the voltage source to the series circuit of the inductance with the capacitance, or to the conductor of the series circuit of the inductance with the capacitance. The compensation voltage can be an AC voltage at a predeterminable frequency which corresponds to the frequency of the alternating current to be suppressed. With the compensation voltage, an undesirable AC voltage component which builds up because of an undesirable alternating current on the capacitor, can be compensated for in the capacitor voltage. As a result of this compensation, an undesirable alternating current at a corresponding frequency can be prevented, making it possible to comply with requirements relating to undesirable alternating currents which must be complied with in a given electrical system.

The disturbance current compensation device according to the disclosure has the ring with an air gap. The ring can be magnetized. A conductor for the connection of the voltage source to the series circuit of the inductance with the capacitance, or a conductor of the series circuit of the inductance with the capacitance, can be surrounded by the ring (e.g., a portion of the conductor can be substantiallly surrounded by the ring). The air gap can be used for application of a compensation voltage by magnetization of the ring, which can be magnetized by means of the magnetization coil. The disturbance current compensation device can therefore be of reasonably simple and uncomplicated design and can be very robust, light in weight and use a minimum amount of space. Particularly in the case of traction applications, that is to say when the electrical system is, for example, an electrical rail vehicle fed from a DC voltage power supply system, simplicity, low weight, robustness and a small space requirement can be desirable, as a result of which the disturbance current compensation device 1 according to the disclosure can be desirable.

Figure 1:
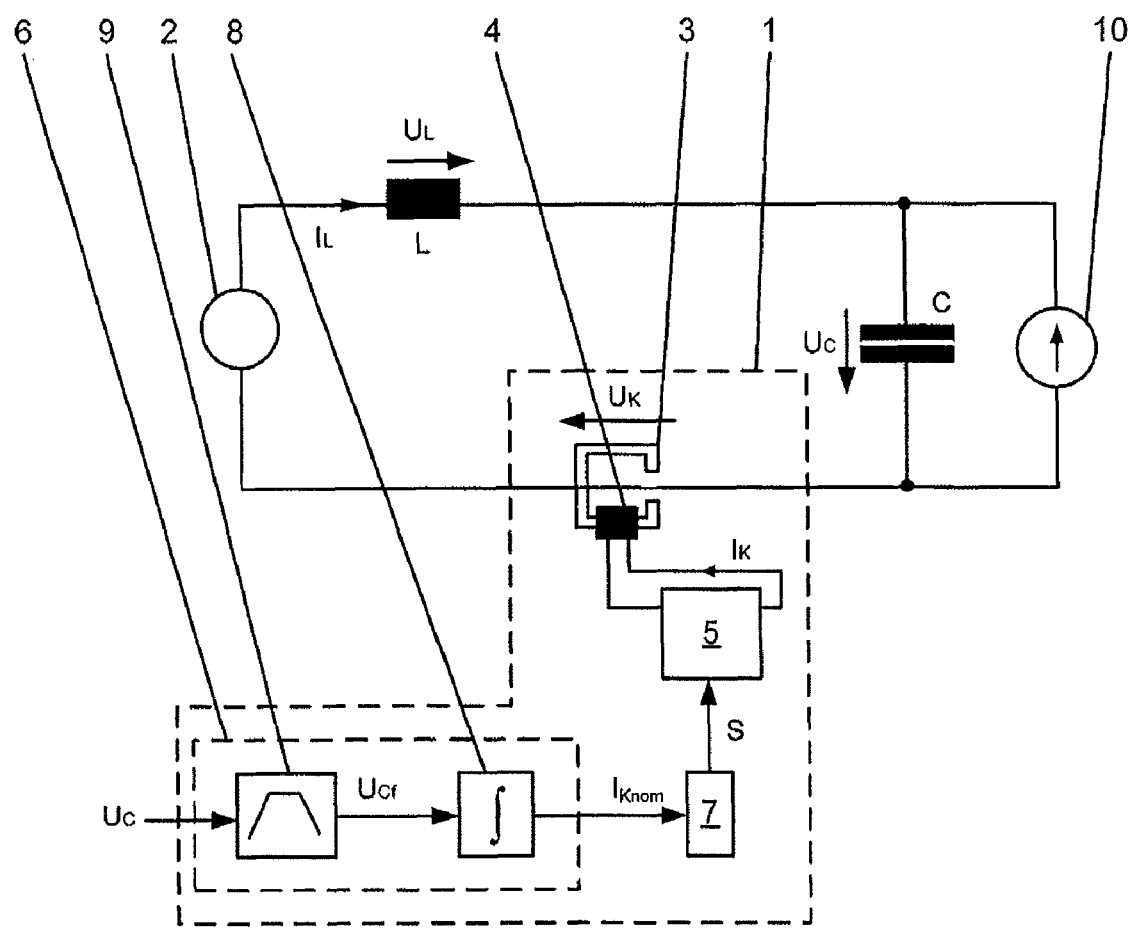
FIG. 1 shows a first embodiment of a disturbance current compensation device according to the disclosure.
Figure 2:
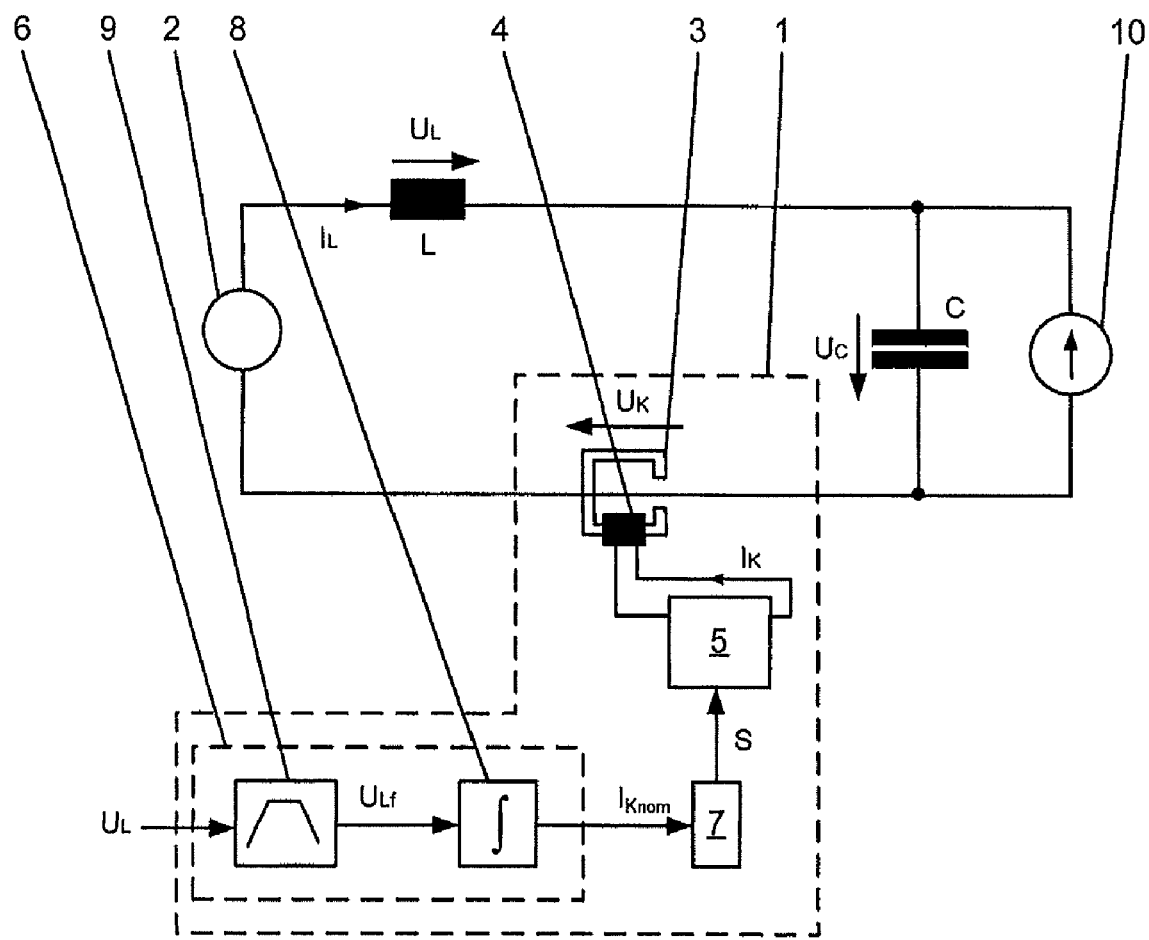
FIG. 2 shows a second embodiment of the disturbance current compensation device according to the disclosure.

FIG. 1 shows a first exemplary embodiment of a disturbance current compensation device 1 according to the disclosure. FIG. 2 shows a second exemplary embodiment of the disturbance current compensation device 1 according to the disclosure. The electrical system which is also shown in FIG. 1 and FIG. 2 contains a voltage source 2 and a series circuit which is connected via a conductor in parallel with the voltage source 2 and has an inductance L and a capacitance C, with the inductance L being connected in series with the capacitance C via a conductor. Using an exemplary method according to the disclosure, the conductor for the connection of the voltage source 2 to the series circuit of the inductance L with the capacitance C, or the conductor of the series circuit of the inductance L with the capacitance C, can be surrounded by a ring 3, which can be magnetized, having an air gap of a disturbance current compensation device 1. The ring which can be magnetized may, for example, have ferromagnetic material and/or may be laminated. In general, any embodiments and materials for rings which can be magnetized and which are known to a person skilled in the art may be used. Furthermore, a compensation voltage $U_K$ is applied by magnetization of the ring 3, which can be magnetized by means of a magnetization coil 4 of the disturbance current compensation device 1, to the conductor for the connection of the voltage source 2 to the series circuit of the inductance L with the capacitance C, and/or to the conductor of the series circuit of the inductance L with the capacitance C. Using the compensation voltage $U_K$, an undesirable AC voltage component which builds up by an undesirable alternating current at the capacitor C can be compensated for in the capacitor voltage $U_C$. As a result of this compensation, undesirable alternating current at a corresponding frequency can be mitigated or prevented. Requirements relating to undesirable alternating currents, which are to be complied with by electrical systems, can thus advantageously be satisfied. Undesirable alternating currents such as these may, for example, originate from an electrical load 10 on the electrical system, that is to say for example from a rotating electrical machine and its power-electronic feed device, with an electrical load 10 such as this being connected in parallel with the capacitance C, as is shown in FIG. 1 and FIG. 2.

An exemplary compensation current $I_K$ is fed into the magnetization coil 4 in order to magnetize the ring 3, which can be magnetized, by means of a converter unit 5 of the disturbance current compensation device 1 having a multiplicity of drivable power semiconductor switches. The magnetization coil 4 and the ring 3 act like a type of subtractor, that is to say the compensation current $I_K$ is dissipated, as a result of which the desired compensation voltage $U_K$ can be formed. Furthermore, a compensation current preset value $I_{Knom}$ can be produced as a function of the voltage $U_C$ on the capacitance C by a regulation device 6 for the disturbance current compensation device 1 as shown in FIG. 1, with the drivable power semiconductor switches of the converter unit 5 then being driven by a drive signal S which is formed from the compensation current preset value $I_{Knom}$ by a drive circuit 7 for the disturbance current compensation device 1. The compensation current preset value $I_{Knom}$ can be formed by integration, by an integration unit 8, in the regulation device 6 from a filtered voltage $U_{Cf}$ on the capacitance C. The filtered voltage $U_{Cf}$ on the capacitance C can be formed by bandpass filtering by means of a bandpass filter 9 in the regulation device 6 from the voltage $U_C$ on the capacitance C. As a result of the bandpass filtering, an undesirable AC voltage component $U_{Cf}$ in the capacitor voltage $U_C$, caused by an undesirable alternating current which is to be compensated for and is caused, for example, by the electrical load 10, is extracted with respect to a frequency, and the compensation current preset value $I_{Knom}$ is then formed therefrom in the manner described above.

Alternatively, according to another exemplary method, the compensation current preset value $I_{Knom}$ can be produced as a function of the voltage $U_L$ on the inductance L by means of the regulation device 6 for the disturbance current compensation device 1 as shown in FIG. 2, wherein the drivable power semiconductor switches of the converter unit 5 are then driven by means of a drive signal S which is formed from the compensation current preset value $I_{Knom}$ by a drive circuit 7 for the disturbance current compensation device 1. As shown in FIG. 2, the compensation current preset value $I_{Knom}$ can then be formed by integration by means of the integration unit 8 in the regulation device 6 from a filtered voltage $U_{Lf}$ on the inductance L, with the filtered voltage $U_{Lf}$ on the inductance L being formed by bandpass filtering by means of a bandpass filter 9 in the regulation device 6 from the voltage $U_L$ on the inductance L. As a result of the bandpass filtering, the undesirable AC voltage component $U_{Lf}$ in the inductance voltage $U_L$, caused by an undesirable alternating current which is to be compensated for and caused, for example, by the electrical load 10 and additionally by the voltage source 2, can be extracted with respect to a frequency, and the compensation current preset value $I_{Knom}$ can then be formed therefrom in the manner described above. An undesirable alternating current which is caused by the voltage source 2, as can occur, for example, in the case of a voltage source in an electrical AC or DC voltage power supply system, can therefore advantageously also be very largely suppressed.

An exemplary disturbance current compensation device 1 according to the disclosure, as shown in FIG. 1 and FIG. 2, has the ring 3, which can be magnetized, and which has the air gap. A conductor for the connection of the voltage source 2 to the series circuit of the inductance L with the capacitance C, or a conductor of the series circuit of the inductance L with the capacitance C, can be surrounded by the ring 3, and the air gap can be used for application of the compensation voltage $U_K$ by magnetization of the ring 3 by means of the magnetization coil 4. In consequence, the disturbance current compensation device 1 can be of reasonably simple and uncomplicated design, can be very robust, light in weight and involve a minimum amount of space. Particularly in the case of traction applications, that is to say when the electrical system is, for example, an electrical rail vehicle fed from a DC voltage power supply system, simplicity, low weight, robustness and a small space requirement are desirable.

Furthermore, the converter unit 5 having a multiplicity of drivable power semiconductor switches can be connected to the magnetization coil 4 for feeding in the compensation current $I_K$. Any converter unit in the form of a voltage converter, current converter or matrix converter may be used as the converter unit.

An exemplary disturbance current compensation device 1 according to the disclosure can include, as shown in FIG. 1, the regulation device 6. The regulation device 6 can be used to produce the compensation current preset value $I_{Knom}$ as a function of the voltage $U_C$ on the capacitance C, and be connected via the drive circuit 7 to the drivable power semiconductor switches in the converter unit 5, in order to form a drive signal S from the compensation current preset value $I_{Knom}$.

As shown in FIG. 1, the regulation device 6 has the integration unit 8 in order to form the compensation current preset value $I_{Knom}$ from the filtered voltage $U_{Cf}$ on the capacitance C, with the regulation device 6 additionally having the bandpass filter 9 in order to form the filtered voltage $U_{Cf}$ on the capacitance C from the voltage $U_C$ on the capacitance C. The bandpass filter 9 allows the undesirable AC voltage component $U_{Cf}$ in the capacitor voltage $U_C$, caused by an undesirable alternating current which is to be compensated for (such as current caused mainly by the electrical load 10), to be extracted with respect to a frequency, with the compensation current preset value $I_{Knom}$ then being formed therefrom in the manner described above.

As an alternative to FIG. 1, the exemplary disturbance current compensation device 1 as shown in FIG. 2 includes the regulation device 6. Here, regulation device 6 is used to produce the compensation current preset value $I_{Knom}$ as a function of the voltage $U_L$ on the inductance L as is connected via a drive circuit 7 to the drivable power semiconductor switches in the converter unit 5, in order to form the drive signal S from the compensation current preset value $I_{Knom}$. As shown in FIG. 2, the regulation device 6 has an integration unit 8 in order to form the compensation current preset value $I_{Knom}$ from the filtered voltage $U_{Lf}$ on the inductance L, wherein the regulation device 6 additionally has a bandpass filter 9 in order to form the filtered voltage $U_{Lf}$ on the inductance L from the voltage $U_L$ on the inductance L. The bandpass filter 9 can allow an undesirable AC voltage component $U_{Lf}$ in the inductance voltage $U_L$, caused, for example, by an undesirable alternating current which is to be compensated for such a current caused by the electrical load 10 and additionally by the voltage source 2, to be extracted with respect to a frequency, with the compensation current preset value $I_{Knom}$ then being formed therefrom in the manner described above. An undesirable alternating current which is caused by the voltage source 2, as can occur, for example, in the case of a voltage source in an electrical AC or DC voltage power supply system, can therefore also advantageously be very largely suppressed.

Thus, it will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

LIST OF REFERENCE SYMBOLS

1 Disturbance current compensation device
2 Voltage source
3 Ring which can be magnetized
4 Magnetization coil
5 Converter unit
6 Regulation device
7 Drive circuit
8 Integration unit
9 Bandpass filter
10 Electrical load

What is claimed is:

1. A method for current compensation for an electrical system having a voltage source and a series circuit of an inductance and a capacitance connected in parallel with the voltage source, wherein the inductance is connected in series with the capacitance via a conductor, the conductor being connected to or within the series circuit, and the conductor being surrounded by a ring which can be magnetized and which includes an air gap of a disturbance current compensation device, the method comprising:
   magnetizing the ring via a magnetization coil of the disturbance current compensation device;
   applying a compensation voltage, by magnetization of the ring, to the conductor connected to or within the series circuit of the inductance and the capacitance;
   feeding a compensation current into the magnetization coil to magnetize the ring, using a converter unit of the disturbance current compensation device having a multiplicity of drivable power semiconductor switches;
   producing a compensation current preset value as a function of the voltage on the capacitance of the series circuit using a regulation device of the disturbance current compensation device; and
   driving the drivable power semiconductor switches of the converter unit by a drive signal which is formed from the compensation current preset value by a drive circuit for the disturbance current compensation device.

2. The method as claimed in claim 1, comprising:
   forming the compensation current preset value by an integration unit in the regulation device from a filtered voltage on the capacitance of the series circuit; and
   forming the filtered voltage on the capacitance by a bandpass filter in the regulation device from the voltage on the capacitance of the series circuit.

3. A disturbance current compensation device for an electrical system, which electrical system has a voltage source and a series circuit of an inductance and a capacitance connected in parallel with the voltage source, the inductance being connected in series with the capacitance via a conductor, wherein the conductor is connected to or within the series circuit, and the conductor is surrounded by a ring which can be magnetized and which includes an air gap of the disturbance current compensation device, the device comprising:
   a ring configured for surrounding a conductor connected to or within the series circuit of the inductance with the capacitance, which ring can be magnetized; and
   an air gap for application of a compensation voltage by magnetization of the ring via a magnetization coil;
   a converter unit, having a multiplicity of drivable power semiconductor switches, connected to the magnetization coil for feeding in a compensation current; and
   a regulation device for producing a compensation current preset value as a function of voltage on the capacitance of the series circuit, the regulation device being connected via a drive circuit to the drivable power semiconductor switches in the converter unit, to form a drive signal from the compensation current preset value.

4. The disturbance current compensation device as claimed in claim 3, wherein the regulation device comprises:
   an integration unit to form the compensation current preset value from a filtered voltage on the capacitance of the series circuit; and
   a bandpass filter to form the filtered voltage on the capacitance of the series circuit from the voltage on the capacitance of the series circuit.

5. A method for current compensation for an electrical system having a voltage source and a series circuit including an inductance and a capacitance connected in parallel with the voltage source, the inductance being connected in series with the capacitance via a conductor, wherein the conductor is connected to or within the series circuit, and the conductor is surrounded by a ring which can be magnetized and which includes an air gap of a disturbance compensation device, the method comprising:

magnetizing the ring via a magnetization coil of the disturbance current compensation device;

applying a compensation voltage, by magnetization of the ring, to the conductor connected to or within the series circuit of the inductance and the capacitance;

feeding a compensation current into the magnetization coil to magnetize the ring, using a converter unit of the disturbance current compensation device having a multiplicity of drivable power semiconductor switches;

producing a compensation current preset value as a function of the voltage on the inductance of the series circuit using a regulation device of the disturbance current compensation device; and driving the drivable power semiconductor switches of the converter unit by a drive signal which is formed from the compensation current preset value by a drive circuit for the disturbance current compensation device.

6. The method as claimed in claim 5, comprising:

forming the compensation current preset value by an integration unit in the regulation device from a filtered voltage on the inductance of the series circuit; and forming the filtered voltage on the inductance by a bandpass filter in the regulation device from the voltage on the inductance of the series circuit.

7. A disturbance current compensation device for an electrical system, which electrical system has a voltage source and a series circuit of an inductance and a capacitance connected in parallel with the voltage source, the inductance being connected in series with the capacitance via a conductor, wherein the conductor is connected to or within the series circuit, and the conductor is surrounded by a ring which can be magnetized and which includes an air gap of the disturbance current compensation device, the device comprising:

a ring configured for surrounding a conductor connected to or within the series circuit of the inductance with the capacitance, which ring can be magnetized; and an air gap for application of a compensation voltage by magnetization of the ring via a magnetization coil;

a converter unit, having a multiplicity of drivable power semiconductor switches, connected to the magnetization coil for feeding in a compensation current; and a regulation device for producing a compensation current preset value as a function of voltage on the inductance of the series circuit, the regulation device being connected via a drive circuit to the drivable power semiconductor switches in the converter unit, to form a drive signal from the compensation current preset value.

8. The disturbance current compensation device as claimed in claim 7, wherein the regulation device comprises:

an integration unit to form the compensation current preset value from a filtered voltage on the inductance of the series circuit; and a bandpass filter to form the filtered voltage on the inductance of the series circuit from the voltage on the inductance of the series circuit.

\* \* \* \* \*